US010547259B1

(12) United States Patent
Rozman et al.

(10) Patent No.: US 10,547,259 B1
(45) Date of Patent: Jan. 28, 2020

(54) ELECTRIC GENERATING SYSTEM WITH AN INTERLEAVED DC-DC CONVERTER

(71) Applicant: Hamilton Sundstrand Corporation, Charlotte, NC (US)

(72) Inventors: Gregory I. Rozman, Myrtle Beach, SC (US); Steven J. Moss, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/053,884

(22) Filed: Aug. 3, 2018

(51) Int. Cl.
| | |
|---|---|
| *H02P 9/30* | (2006.01) |
| *H02P 101/30* | (2015.01) |
| *H02M 7/06* | (2006.01) |
| *H02M 3/158* | (2006.01) |
| *H02M 1/12* | (2006.01) |
| *H02M 1/44* | (2007.01) |

(52) U.S. Cl.
CPC .......... *H02P 9/305* (2013.01); *H02M 1/126* (2013.01); *H02M 3/1588* (2013.01); *H02M 7/06* (2013.01); *H02M 1/44* (2013.01); *H02P 2101/30* (2015.01); *H02P 2201/09* (2013.01)

(58) Field of Classification Search
USPC .................. 322/25, 27, 29, 59; 290/40 C, 54
See application file for complete search history.

(56) References Cited

U.S. PATENT DOCUMENTS

| | | | | |
|---|---|---|---|---|
| 6,686,718 | B2 * | 2/2004 | Jadric | H02M 5/458 318/479 |
| 6,788,029 | B1 * | 9/2004 | Gabrys | H02J 1/16 307/67 |
| 7,148,649 | B2 * | 12/2006 | Ganev | H02J 3/24 318/701 |
| 7,408,327 | B2 | 8/2008 | Shah et al. | |
| 7,710,081 | B2 * | 5/2010 | Saban | H02K 3/28 290/4 R |
| 7,960,948 | B2 * | 6/2011 | Saban | H02K 3/28 310/162 |
| 8,106,526 | B2 * | 1/2012 | Abolhassani | H02K 3/28 290/43 |
| 8,129,853 | B2 * | 3/2012 | Abolhassani | H02K 3/28 290/44 |
| 8,148,834 | B2 * | 4/2012 | Huang | F02N 11/04 290/31 |
| 8,358,111 | B2 * | 1/2013 | Rozman | H02P 9/307 322/46 |
| 8,378,641 | B2 | 2/2013 | Rozman et al. | |
| 8,836,293 | B1 * | 9/2014 | Rozman | H02P 9/48 322/25 |
| 9,059,647 | B2 | 6/2015 | Rozman et al. | |
| 9,252,645 | B2 * | 2/2016 | Crane | H02P 25/22 |

(Continued)

*Primary Examiner* — Pedro J Cuevas
(74) *Attorney, Agent, or Firm* — Cantor Colburn LLP

(57) ABSTRACT

Embodiments of a method, controller and system include an electric generating system with interleaved direct current DC-DC converter are provided. The embodiments include a controller, a permanent magnet generator (PMG), wherein the PMG provides a 6-phase PMG, and a rectification stage coupled to the PMG. The embodiments also include a boost converter stage coupled to the rectification stage, wherein the boost converter stage comprises four phases, a DC link capacitor coupled to the boost converter stage, and an output filtering stage coupled to the DC link capacitor.

20 Claims, 3 Drawing Sheets

(56) References Cited

U.S. PATENT DOCUMENTS

| | | | |
|---|---|---|---|
| 9,577,557 B2* | 2/2017 | Bala | F01D 15/10 |
| 9,969,273 B2* | 5/2018 | Rozman | B60L 1/003 |
| 10,396,680 B1* | 8/2019 | Rozman | H02P 9/34 |
| 2005/0179264 A1* | 8/2005 | Ganev | H02J 3/24 |
| | | | 290/40 C |
| 2009/0009146 A1* | 1/2009 | Rozman | H02P 9/10 |
| | | | 322/27 |
| 2011/0133703 A1* | 6/2011 | Rozman | H02P 9/307 |
| | | | 322/59 |
| 2012/0007428 A1* | 1/2012 | Rozman | H02J 3/36 |
| | | | 307/66 |
| 2012/0126758 A1 | 5/2012 | Fang et al. | |
| 2013/0193813 A1 | 8/2013 | Rozman et al. | |
| 2014/0062269 A1* | 3/2014 | Crane | H02P 25/22 |
| | | | 310/68 R |
| 2014/0266077 A1* | 9/2014 | Rozman | H02P 9/305 |
| | | | 322/25 |
| 2015/0108761 A1* | 4/2015 | Bala | F01D 15/10 |
| | | | 290/54 |
| 2018/0015831 A1* | 1/2018 | Rozman | B60L 1/003 |
| 2018/0056793 A1* | 3/2018 | Rozman | B60L 11/08 |
| 2018/0131254 A1 | 5/2018 | Rozman et al. | |
| 2019/0081582 A1* | 3/2019 | Rozman | H02M 5/4585 |

\* cited by examiner

ELECTRIC GENERATING SYSTEM WITH AN INTERLEAVED DC-DC CONVERTER

BACKGROUND

The subject matter disclosed herein relates generally to electric power generating systems, and more particularly to direct current electric generating systems with an interleaved DC-DC converter.

Generally, direct current (DC) power generating systems for aircraft and other vehicles employ a permanent magnet generator (PMG) and rectifiers. Oftentimes a voltage ripple on the direct current bus exists after rectification of the generator output. To reduce the DC bus voltage ripple to levels that are appropriate to meet specification requirements for the DC load, a relatively large DC bus capacitor may be required in the system, adding weight and size to the system. There may be a need to improve the performance which can result in smaller passive components and reduced weight to the power generating system.

BRIEF DESCRIPTION

According to an embodiment, an electric generating system with interleaved direct current DC-DC converter is provided. The system includes a controller, a permanent magnet generator (PMG), wherein the PMG provides a 6-phase PMG, and a rectification stage coupled to the PMG. The systems also includes a boost converter stage coupled to the rectification stage, wherein the boost converter stage comprises four phases, a DC link capacitor coupled to the boost converter stage, and an output filtering stage coupled to the DC link capacitor.

In addition to one or more of the features described herein, or as an alternative, further embodiments include a rectification stage that includes a first rectifier and a second rectifier, wherein the first rectifier is 30° phase shifted from the second rectifier.

In addition to one or more of the features described herein, or as an alternative, further embodiments include a rectification stage that is a passive rectification stage.

In addition to one or more of the features described herein, or as an alternative, further embodiments include a rectification stage having a first 6-pulse rectifier and a second 6-pulse rectifier.

In addition to one or more of the features described herein, or as an alternative, further embodiments include phases of the boost converter are phase shifted 90°.

In addition to one or more of the features described herein, or as an alternative, further embodiments include phases of the boost converter having a first and second switching device.

In addition to one or more of the features described herein, or as an alternative, further embodiments include a damping circuit that is coupled to the output of the boost converter stage.

In addition to one or more of the features described herein, or as an alternative, further embodiments include an output filtering stage includes an inductor, a damper, and a filter capacitor.

According to another embodiment, a controller for operating a DC electric generating system with an interleaved DC-DC converter is provided. The controller includes a voltage regulator configured to detect the output voltage of a direct current (DC) bus, a current regulator for each phase of a rectifier, the current regulator configured to detect a current of each phase of the converter, and a comparator configured to generate an output to control switching of a plurality of switches of the converter.

In addition to one or more of the features described herein, or as an alternative, further embodiments include a voltage regulator that is configured to determine a current reference based on the output voltage of the DC bus and a voltage reference of the system.

In addition to one or more of the features described herein, or as an alternative, further embodiments include a current reference that is based on a proportional integral of a voltage error of the output voltage of the DC bus and a voltage reference of the system.

In addition to one or more of the features described herein, or as an alternative, further embodiments include a current regulator that is configured to determine a current error based on the current reference and a current feedback from each phase of the converter.

In addition to one or more of the features described herein, or as an alternative, further embodiments include a controller that is configured to control switch based on a proportional integral of the current error.

In addition to one or more of the features described herein, or as an alternative, further embodiments include a controller that is configured to operate each phase of the converter 90° out-of-phase of a next phase.

According to a different embodiment, a method for operating a DC electric generating system with an interleaved DC-DC converter is provided. The method includes generating an output voltage for the system, and regulating the output voltage of the system. The method also includes regulating a current for each phase of a boost converter, and control switching of a boost converter stage.

In addition to one or more of the features described herein, or as an alternative, further embodiments include a generating an output voltage includes receiving a first 6-pulse rectification signal and a second 6-pulse rectification signal.

In addition to one or more of the features described herein, or as an alternative, further embodiments include a first and second rectification signals that are generated from passive rectification stages, respectively.

In addition to one or more of the features described herein, or as an alternative, further embodiments include interleaving each of the phases of the boost converter.

In addition to one or more of the features described herein, or as an alternative, further embodiments include phases that are phase shifted 90°.

In addition to one or more of the features described herein, or as an alternative, further embodiments include phases of the boost converter having a first and second switching device.

BRIEF DESCRIPTION OF THE DRAWINGS

The following descriptions should not be considered limiting in any way. With reference to the accompanying drawings, like elements are numbered alike.

DETAILED DESCRIPTION

In electric power generating systems that use generators to generate power use generators that produce an alternating current (AC) signal that must be rectified. The rectification of the AC signals can cause voltage ripples on the output DC bus which directly impacts the quality of the generated power. In order to compensate for the voltage ripple, large passive components such as capacitors and inductors may be required in the system. For example, the conventional 3-phase permanent magnet generators (PMG) coupled with two-level active rectifiers require large size passive components, such as DC-link capacitors and output power quality filters.

There is a need to improve power generating systems that optimally integrate a PMG and power converter into an affordable high power density alternator with a good power quality, reduced loss, and low torque pulsation. The power generation architecture described herein uses a 6-phase PMG. The 6-phase PMG is coupled to two 6-pulse rectifiers where the output of the 6-pulse rectifier is coupled to a boost converter stage. Because there is no active rectification performed in the system there is no need for a position sensor to synchronize the position of the PMG with the output. The configuration of the boost converter operates in a manner to provide a 4-phase interleaved output to significantly reduce a portion of the voltage ripple on the DC bus. Conventional boost converters use diodes coupled to the switches to control the flow of current from the boost inductor. However, in the architecture described herein, a semiconductor switch is provided in place of the diode of the conventional boost converters to provide improved efficiency by reducing conduction losses. Finally, the output voltage is provided to multiple filtering stages to further condition the output power into a high-quality power.

Figure 1:
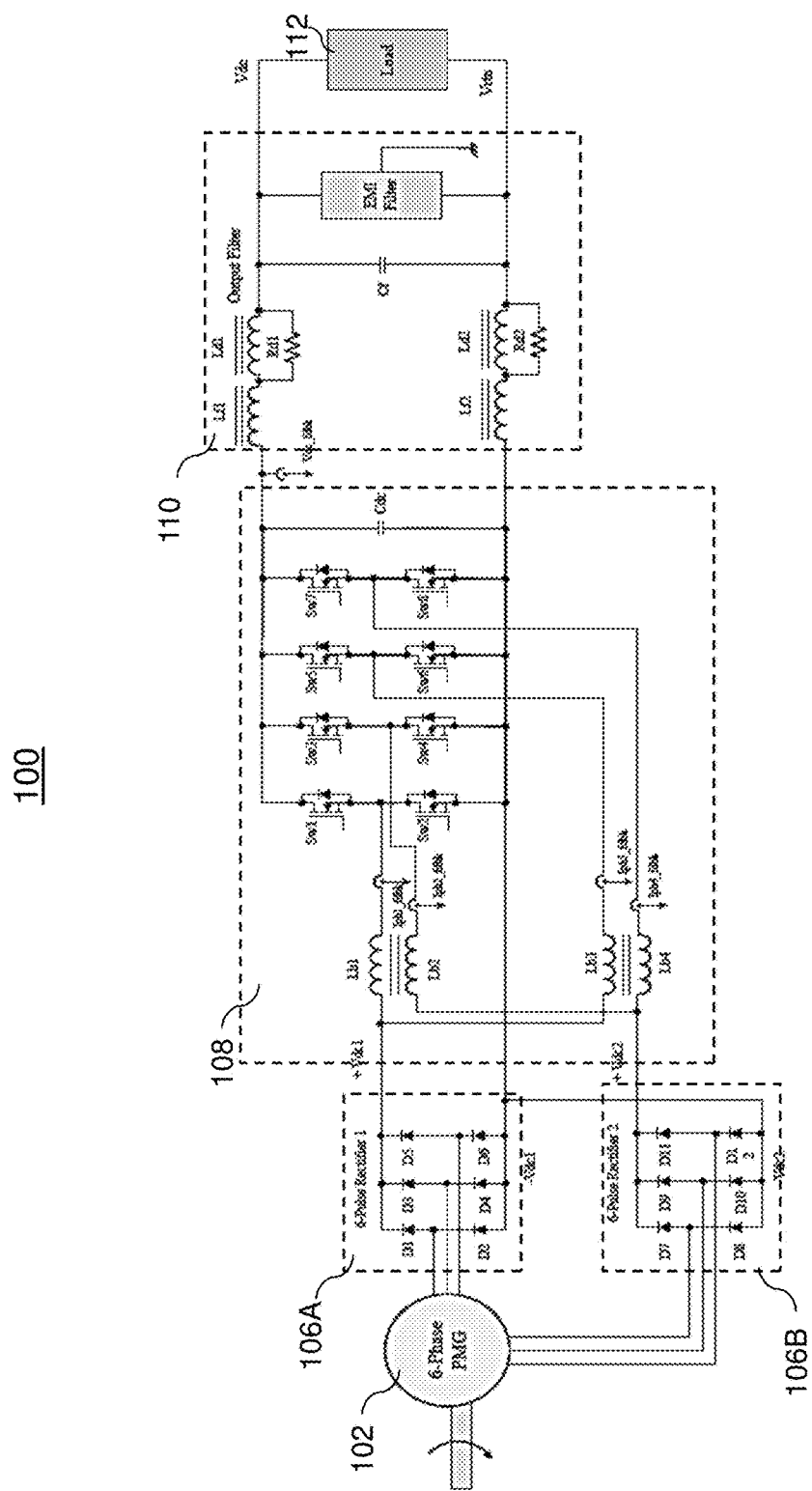
FIG. 1 depicts a power generation system in accordance with one or more embodiments.

Turning now to FIG. 1, an electric power generation system 100 in accordance with one or more embodiments is shown. As illustrated, the system 100 includes a permanent magnet generator (PMG) 102. The PMG 102 is a 6-phase PMG and includes two sets of windings that are phase shifted 30° between two sets of three-phase windings with harmonic components of $6n\pm1$ (n=0, 1, 2, . . . ). The lowest order harmonic torque ripple is produced by the $11^{th}$ and $13^{th}$ current harmonics. The currents of order $6n\pm1$ do not contribute to either the average torque or torque ripple production and the techniques described herein cancels the $6^{th}$ harmonics which reduces the PMG torque pulsation.

The rectification stage coupled to the PMG 102 includes two 6-pulse rectifiers where a first 3-phase output of the PMG 102 is coupled to a first rectifier 106A and a second 3-phase output of the PMG 102 is coupled to a second rectifier 106B. A first 6-pulse rectifier includes a set of diodes D1-D6 and a second rectifier includes a set of diodes D7-D12. In one or more embodiments, the first and second rectifiers 106A and 106B are passive rectifiers and do not require an active control by a controller.

The output of the first and second 6-pulse rectifiers are coupled to the boost converter stage 108. A boost converter is a DC-DC power converter that has an output voltage that is greater than its input voltage. Each phase of the DC-DC boost converter 108 includes a boost inductor (Lb1, Lb2, Lb3, Lb4), a converter switch (Sw2, Sw4, Sw6, Sw8), a switch (Sw1, Sw3, Sw5, Sw7) that performs synchronous rectification to reduce conduction losses of the traditional diode used in this configuration, and a current sensor (Iph1_fdbk, Iph1_fdbk, Iph2_fdbk, Iph3_fdbk, Iph4_fdbk). The system 100 also includes a voltage sensor measured at point Vdc_fdbk across the capacitor Cdc in communication with a controller for voltage regulation.

Figure 2:
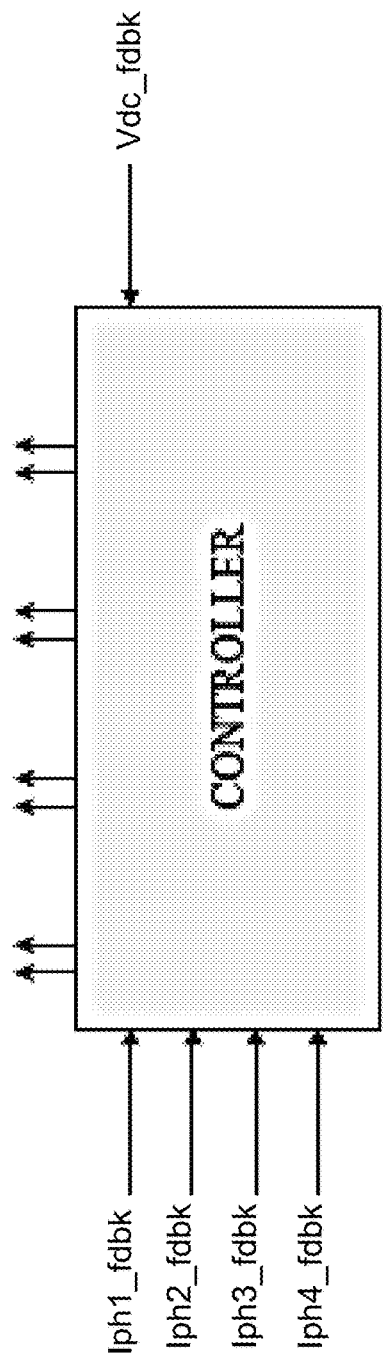
FIG. 2 depicts a controller in accordance with one or more embodiments.

As shown in FIG. 1, the current sensors are coupled to the boost inductors Lb1, Lb2, Lb3, and Lb4 and provide a current feedback signal Iph1_fdbk, Iph2_fdbk, Iph3_fdbk, and Iph4_fdbk of each phase of the boost converter stage 108 to the controller 200 of FIG. 2. The boost converter is a 4-phase interleaved DC-DC boost converter which reduces the DC bus voltage ripple and allows for the reduction in the size of the DC link capacitor and other output filtering elements.

The system 100 further includes a controller 200 discussed below with reference to FIG. 2 and FIG. 3, which is in communication with the gate drives 312. The controller 200 is configured to apply a pulse width modulated signal to the gate drives 312. The controller includes a PWM modulator configured to provide the PWM signal.

In one or more embodiments, the output of the first rail of the DC bus includes an inductor Lf1 in series with a damper circuit including inductor Ld1 in parallel with the resistor Rd1. The second rail of the DC bus includes an inductor Lf2 in series with a second damper circuit including an inductor Ld2 in parallel with the resistor Rd2. Furthermore, a filter capacitor Cf and electromagnetic interference filter EMI may be arranged across the DC output bus.

The system 100 further includes a load 112 in communication with the first and second active rectifiers. The load 112 may be any suitable DC load applied to the DC output bus of the rectifiers. For example, as described above, the DC load may be a constant power DC load.

FIG. 2 illustrates a controller 200, in accordance with one or more embodiments. The controller 200 is configured to receive a plurality of feedback signals and generate signals to control the switching of the switches SW1-SW8, such as MOSFETs, of the boost converter stage 108. The controller 200 receives the DC voltage feedback signal (Vdc_fdbk) and phase-current feedback signals (Iph1_fdbk-Iph4_fdbk) for each phase of the boost converter stage 108. According to the logic shown in FIG. 3, the controller 200 generates signals to control the boost converter stage 108 based on the voltage feedback Vdc_fdbk and current feedback Iph1_fdbk signals.

Figure 3:
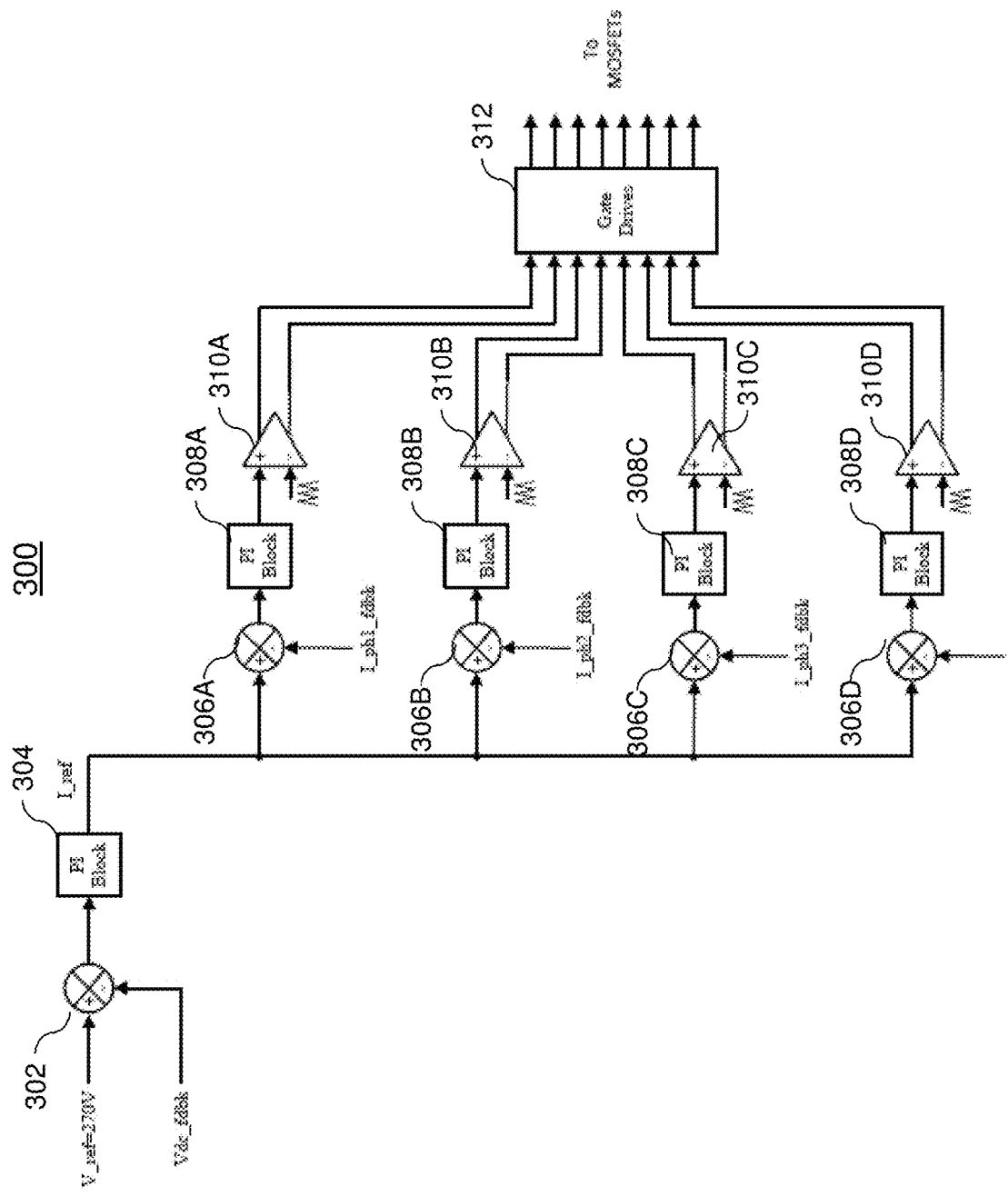
FIG. 3 depicts the logic for the controller in accordance with one or more embodiments.

Now turning to FIG. 3, the logic diagram 300 for the system controller 200 in accordance with one or more embodiments is shown. The logic diagram 300 includes a voltage regulator and a set of current regulators. The carrier signal of each of the current regulators pulse-width-modulator (PWM) is phase shifted by 90° in relationship with the next one (interleaving). The outputs of the current regulators PWMs are connected to the MOSFET gates of the boost converter stage 108.

As illustrated in FIG. 3, the voltage regulator receives a reference voltage and a feedback voltage from the output of the DC electric generating system shown in FIG. 1. In this non-limiting example, the reference voltage is 270V. The difference (e.g., voltage error) between the reference and feedback voltages is determined at the summer 302 and provided to the proportional integral (PI) block 304. The PI block 304 generates a current reference signal which is provided for each phase.

Each phase includes a current regulator including summers 306, PI block 308 and comparators 310. The current regulator includes a summer 306 that is configured to receive the reference current signal and the current feedback from each respective phase. The difference (e.g., current error) between the reference and feedback current is determined at the summer 306A-D and the result is provided to a PI block 308A-D. The output of the PI block 308A-D is provided to respective comparators 310A-D which compares the output of the PI block 308A-D with a reference signal. In this non-limiting example, the reference signal received at the comparator 310A-D is a triangle wave.

The control for the current regulators for each phase of the boost converter stage 108 of the system 100 of FIG. 1 is illustrated in FIG. 3. The second phase, the third phase, and fourth phase are used and interleaved with each other phase which results in a reduction in the voltage ripple experienced at the output of the power generation system 100. The controller 200 is operated to interleave each phase of the boost converter 108 at 90° from the next phase.

The outputs of the current regulators are connected to the switch gates via gate drive 312 and are configured to control the switching of the boost converter stage 108. The gate drive 312 may be configured to open and close each of the plurality of switches S1-S8.

The techniques described herein provide a DC power generating system architecture for 270 Vdc applications. The system includes a 6-phase variable-speed PMG driven by a prime mover and connected to two passive 6-pulse rectifiers followed by a 4-phase interleaved DC-DC boost converter.

The technical effects and benefits include eliminating the need for a PMG position sensor; therefore, there is no need to track the position of the PMG during operation. In addition, the power quality is improved by reducing the output voltage ripple so there is no longer a need for large passive components to produce a high-quality signal. Also, the power density of the system is improved by implementing the techniques described herein.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An electric generating system with interleaved direct current DC-DC converter, the system comprising:
   a controller;
   a permanent magnet generator (PMG), wherein the PMG provides a 6-phase PMG;
   a rectification stage coupled to the PMG;
   a boost converter stage coupled to the rectification stage, wherein the boost converter stage comprises four phases;
   a DC link capacitor coupled to the boost converter stage; and
   an output filtering stage coupled to the DC link capacitor.

2. The system of claim 1, wherein the rectification stage includes a first rectifier and a second rectifier, wherein the first rectifier is 30° phase shifted from the second rectifier.

3. The system of claim 1, wherein the rectification stage is a passive rectification stage.

4. The system of claim 1, wherein the rectification stage includes a first 6-pulse rectifier and a second 6-pulse rectifier.

5. The system of claim 1, wherein each phase of the boost converter is phase shifted 90°.

6. The system of claim 1, wherein each phase of the boost converter includes a first and second switching device.

7. The system of claim 1, the system further comprising a damping circuit coupled to the output of the boost converter stage.

8. The system of claim 1, wherein the output filtering stage includes an inductor, a damper, and a filter capacitor.

9. A controller for operating a DC electric generating system with an interleaved DC-DC converter, the controller comprising:
   a voltage regulator configured to detect the output voltage of a direct current (DC) bus;
   a current regulator for each phase of a rectifier, the current regulator configured to detect a current of each phase of the converter;
   a comparator configured to generate an output to control switching of a plurality of switches of the converter.

10. The controller of claim 9, wherein the voltage regulator is configured to determine a current reference based on the output voltage of the DC bus and a voltage reference of the system.

11. The controller of claim 10, wherein the current reference is based on a proportional integral of a voltage error of the output voltage of the DC bus and a voltage reference of the system.

12. The controller of claim 9, wherein each current regulator is configured to determine a current error based on the current reference and a current feedback from each phase of the converter.

13. The controller of claim 12, wherein the controller is configured to control switch based on a proportional integral of the current error.

14. The controller of claim 9, wherein the controller is configured to operate each phase of the converter 90° out-of-phase of a next phase.

15. A method for operating a DC electric generating system with an interleaved DC-DC converter, the method comprising:
   generating an output voltage for the system;
   regulating the output voltage of the system;
   regulating a current for each phase of a boost converter; and
   control switching of a boost converter stage.

16. The method of claim 15, wherein generating the output voltage comprises receiving a first 6-pulse rectification signal and a second 6-pulse rectification signal.

17. The method of claim 16, wherein the first and second rectification signals are generated from passive rectification stages, respectively.

18. The method of claim 15, wherein controlling the switching comprises interleaving each of the phases of the boost converter.

19. The method of claim 18, wherein the switching of each phase is phase shifted 90°.

20. The controller of claim 15, wherein each phase of the boost converter includes a first and second switching device.

* * * * *